Oct. 15, 1968 P. T. HUBENAAR 3,405,512
HAY CONDITIONER
Filed Oct. 1, 1965 2 Sheets-Sheet 1

INVENTOR
PETER T. HUBENAAR
BY Tweedale & Gerhardt
ATTORNEYS

Oct. 15, 1968     P. T. HUBENAAR     3,405,512
HAY CONDITIONER
Filed Oct. 1, 1965     2 Sheets-Sheet 2
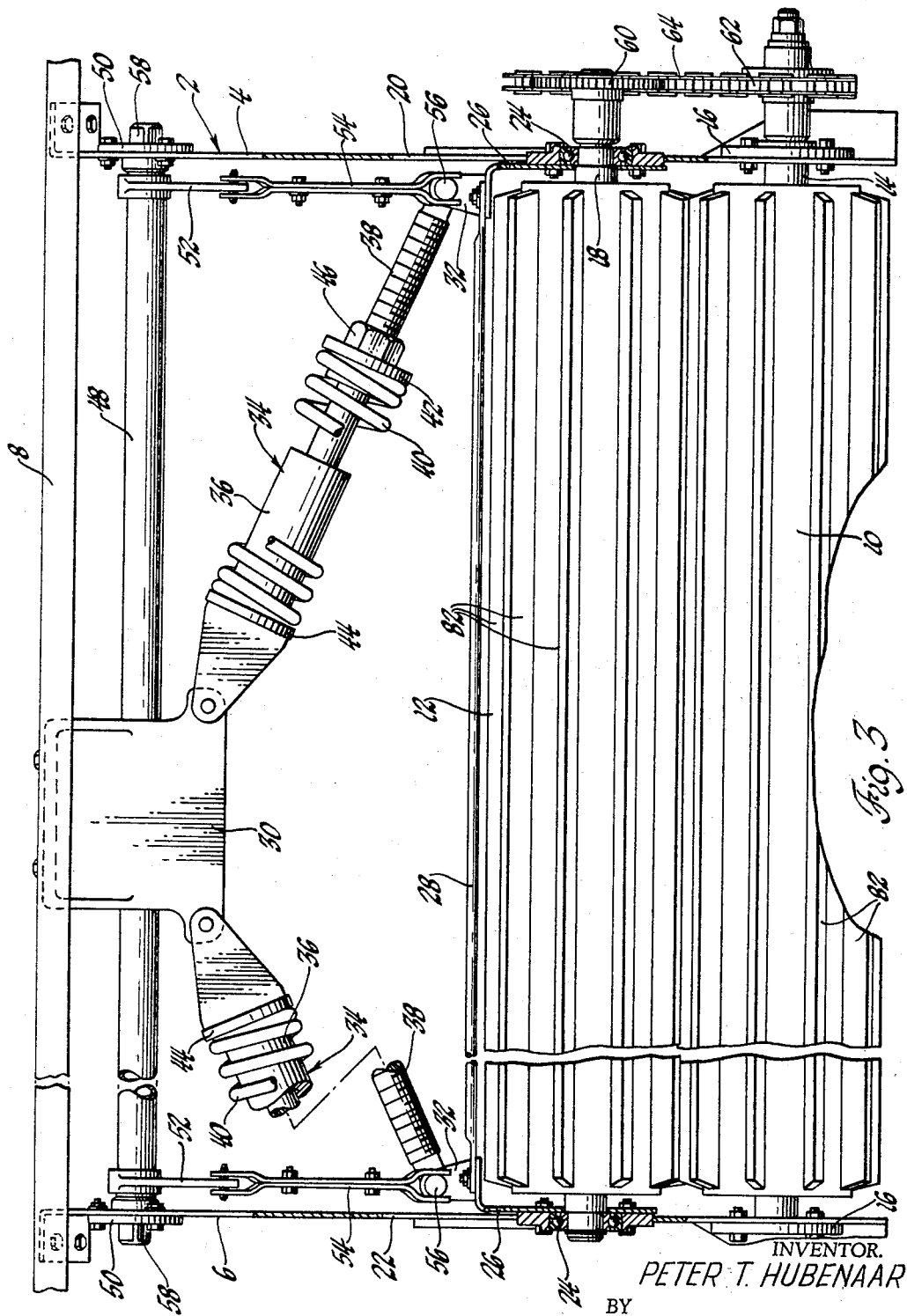
INVENTOR.
PETER T. HUBENAAR
BY
Tweedale & Gerhardt
ATTORNEYS.

United States Patent Office 3,405,512
Patented Oct. 15, 1968

3,405,512
HAY CONDITIONER
Peter T. Hubenaar, Toronto, Ontario, Canada, assignor to Massey-Ferguson Industries Limited, Toronto, Ontario, Canada
Filed Oct. 1, 1965, Ser. No. 492,176
6 Claims. (Cl. 56—1)

This invention relates generally to agricultural machines for processing hay and similar crops, and is particularly concerned with hay conditioners.

Hay conditioners are used to crimp or crush hay and like crops to shorten the drying time, and generally include a pair of cooperating rolls for crushing or crimping crop material as it is fed between the rolls. The conditioning rolls are generally mounted in such a manner that when a large mass or wad of material encounters the rolls, one of the rolls can resiliently move away from the other to accommodate the material. Moreover, provision must be made for separating the rolls when they become clogged or jammed by rocks or large masses of crop material.

In accordance with the present invention, the conditioning rolls are mounted between a pair of spaced frame members in such a manner that they can move toward and away from each other. Extending between the frame members and rotatable therein is a torque bar which is connected with opposite ends of one of the rolls by a linkage in such a manner that the ends of the roll to which it is connected must move simultaneously and maintain the rolls in parallel relationship. By rotating the torque bar manually against biasing springs, the rolls can be separated to remove large masses of crop material or foreign objects, such as rocks which tend to clog the rolls.

The objects, advantages and features of the invention will become apparent from the following description taken in connection with the accompanying drawing in which:

FIG. 3 is a front elevation of the hay conditioner of FIGS. 1 and 2.

Figures 1, 2:
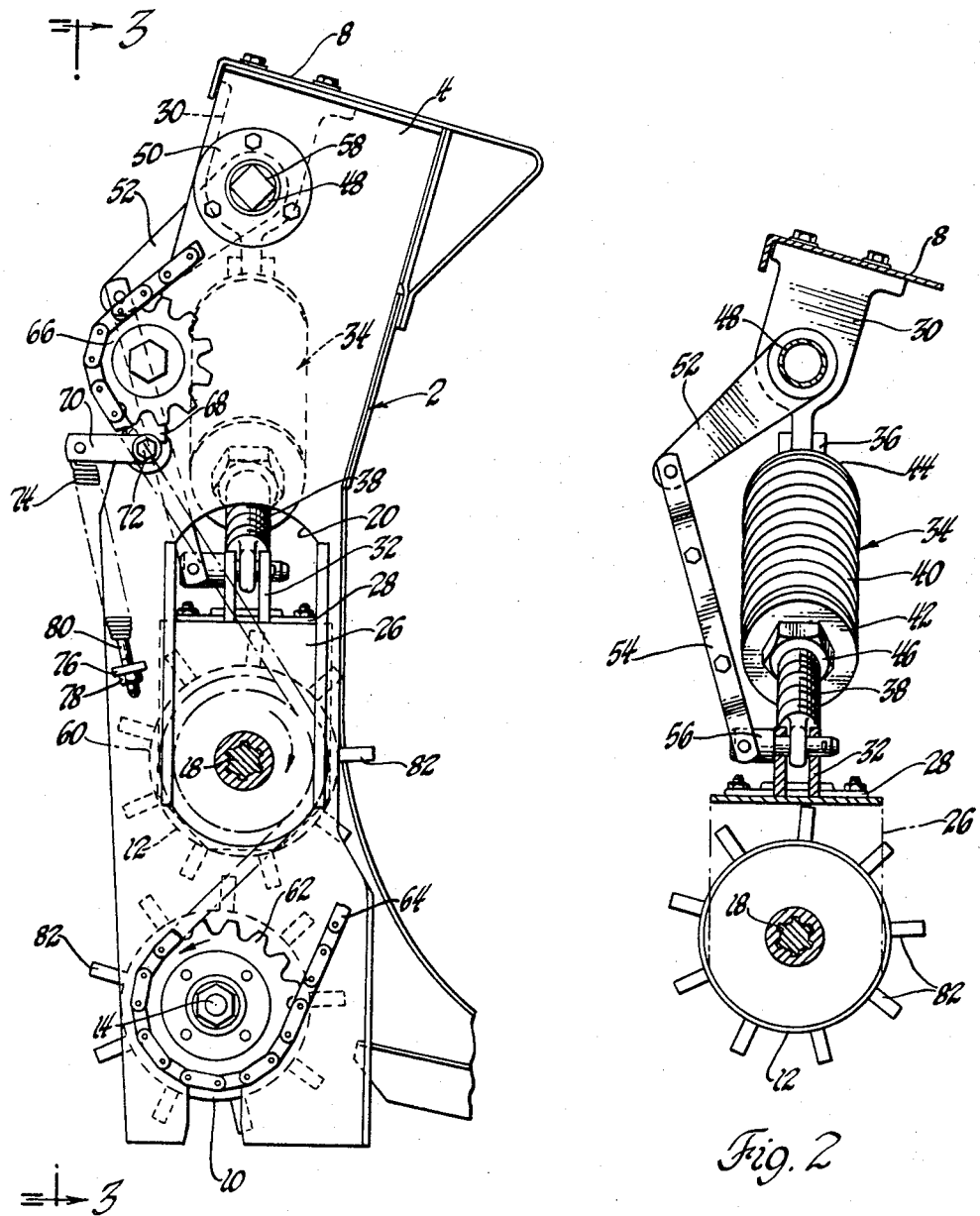
FIG. 1 is an elevation of a hay conditioner embodying the invention in its preferred form.
FIG. 2 is a sectional view of the hay conditioner of FIG. 1.

In the drawings, a supporting frame is designated generally by reference numeral 2 and includes a pair of spaced parallel side members 4 and 6 depending from a cross piece 8. Supported between side members 4 and 6 is a pair of cooperating conditioning rolls 10 and 12.

The lower roll 10 is mounted on a shaft 14 which is supported in bearings 16 secured to side members 4 and 6 such that the lower roll rotates about a fixed axis with respect to the frame. The upper roll 12 is mounted on a shaft 18 the ends of which extend through slots 20 and 22 formed in side members 4 and 6, respectively. Shaft 18 is rotatably mounted in bearings 24 secured to the depending legs 26 of a carrier 28 slidably supported in slots 20 and 22 such that the upper roll 12 rotates about a floating axis with respect to frame 2 and roll 10.

A support member 30 is mounted on cross piece 8 between side members 4 and 6 for supporting one end of a pair of spring loaded plungers 34, the other ends of which are pivotally supported on lugs 32 projecting upwardly from opposite ends of carrier 28. Plungers 34 each include an upper telescoping member 36 which is pivotally connected with support member 30 and a lower telescoping member 38 which is pivotally connected with lugs 32. The telescoping members 36 and 38 are biased away from each other by a compression spring 40 having one end engaged with a fixed spring seat 44 formed on the upper telescoping member 36 and its other end seated on an adjustable spring seat 42 on the lower telescoping member 38. Member 38 is threaded at its lower end for receiving an adjustment nut 46 for moving spring seat 42 axially along member 38 to increase or decrease the compression of spring 40.

Rotatably mounted in bearings 50 secured to side members 4 and 6 beneath cross piece 8 is a torque bar 48 which is rotatably received in an opening in support member 30. Fixed to the opposite ends of torque bar 48 is a pair of parallel, radially extending levers 52 which are pivotally connected by links 54 with the head of a pivot member 56 connecting the lower telescoping member 38 of plunger 34 with the lugs 32. As a result, any movement of the right end of the floating roll 12 relative to roll 10 causes rotation of torque bar 48 through the associated link and lever 52 and 54, which rotation acts through the other lever and link 52 and 54 to raise the opposite end of roll 12 a corresponding distance and thus maintains roll 12 constantly in parallel relationship with roll 10. The ends of torque bar 48 projecting outwardly from side members 4 and 6 may be of non-circular configuration as illustrated at 58 for receiving a wrench or other tool by means of which the upper roll 12 can be manually raised against springs 40 to remove rocks or other material from between the rolls.

Fixed to the ends of shafts 18 and 14 are sprockets 60 and 62, respectively, as shown at the right hand end of FIG. 3. Rolls 10 and 12 are driven by a drive chain 64 engaged with sprockets 60 and 62 as well as a tension idler sprocket 66 mounted on one arm of a bell crank lever 68 fulcrumed at 72 on side member 4. The other arm 70 of bell crank 68 supports one end of a spring 74, the other end of which is supported on a rod 80 extending through an opening in a lug 76 and secured thereto by a nut 78. Spring 74 biases sprocket 66 in a counterclockwise direction as viewed in FIG. 1 about fulcrum 72 to maintain constant tension on drive chain 64 and accommodate relative movement between rolls 10 and 12.

In the illustrated embodiment, conditioning rolls 10 and 12 are formed with radially extending blades 82 for crimping the crop material as it passes between the rolls. The material is fed between the rolls toward the left in FIG. 1 and blades 82 cooperate to crimp the stems of the hay or other crop material as it passes through the rolls to decrease the drying time. Should a wad or mass of material pass between one end of the rolls, the torque bar and linkage 52 and 54 maintains the floating roll 12 in parallel relationship with the fixed roll 10 to thus maintain a uniform relationship between the rolls and prevent the chain 64 from jumping sprockets 60 or 62 and interrupting the drive. In the event of jamming of the rolls by a large wad of material or by rocks or other foreign objects, torque bar 48 can be rotated by a tool engaged with ends 58 to clear the rolls.

While a specific embodiment of the invention is illustrated and described in the foregoing drawings and specification, various equivalents and alternatives in the construction and arrangement of parts, all falling within the scope and spirit of the invention, will become apparent to those skilled in the art.

I claim:

1. In a hay conditioner including a frame having a pair of spaced side members, a pair of opposed conditioning rolls rotatably mounted between the side members for relative movement toward and away from each other, means biasing the rolls toward each other, and means for constraining said rolls to remain in parallel relationship in all positions of the rolls with respect to each other characterized in that said constraining means comprises; a carrier slideably supported on and extending between said side members, one of said rolls being rotatably mounted on said carrier and the other of said rolls being supported for rotation about a fixed axis relative to said side member, a torque bar rotatably mounted between said side members, and linkage means connecting opposite ends of one of said rolls with said torque bar operative to cause said torque bar to rotate in response to relative movement between adjacent ends of said rolls and simultaneuosly move the other ends of said rolls relative to each other a corresponding distance, said linkage means comprising a pair of spaced, parallel levers fixed to and projecting radially from said torque bar, and a pair of links, each pivotally connected between one of said levers and said carrier at spaced points on said carrier.

2. The construction defined in claim 1 further including a cross piece extending between said side members, and wherein said biasing means comprises a pair of telescoping plungers having one of their ends each supported on said cross piece and their other ends supported at spaced points on said carrier, and a spring on each of said plungers biasing the plungers to extend and urge said carrier and one roll toward said other roll.

3. The construction defined in claim 2 further including means for simultaneously driving said rolls to rotate in opposite directions about their respective axes.

4. The construction defined in claim 3 wherein said driving means comprises a sprocket on adjacent ends of each roll, a drive chain coupled with said sprockets, and a tension idler sprocket mounted on the side member adjacent said sprockets for taking up slack in said chain to accommodate relative movement between the rolls.

5. In a hay conditioner including a frame having a pair of spaced side members, a pair of opposed conditioning rolls rotatably mounted between the side members for relative movement toward and away from each other, means biasing the rolls toward each other, and means for constraining said rolls to remain in parallel relationship in all positions of the rolls with respect to each other, characterized in that said constraining means comprises; a torque bar rotatably mounted between said side members, and linkage means connecting opposite ends of one of said rolls with said torque bar operative to cause said torque bar to rotate in response to relative movement between adjacent ends of said rolls and simultaneously move the other ends of said rolls relative to each other a corresponding distance, and including a cross-piece extending between said side members, a support member mounted on said cross-piece intermediate said side members, said biasing means comprising a pair of telescoping plungers connected between said support member and opposite ends of one of said rolls such that said plungers diverge from said support member toward said one roll, and a spring on each of said plungers biasing the plungers to extend and urge said one roll toward the other roll.

6. The construction defined in claim 5 wherein said torque bar is rotatably received in said support member and wherein said linkage means is connected with each of said plungers to constrain said plungers to simultaneously extend and retract.

References Cited
UNITED STATES PATENTS

| | | | |
|---|---|---|---|
| 2,958,991 | 11/1960 | Heth | 56—1 |
| 3,006,124 | 10/1961 | Glass et al. | 56—1 |
| 3,116,582 | 1/1964 | Wathen et al. | 56—1 |
| 3,116,581 | 1/1964 | Corkery | 56—1 |
| 3,146,569 | 9/1964 | Hale et al. | 56—1 |
| 3,339,359 | 9/1967 | Burrough et al. | 56—1 |

ROBERT E. BAGWILL, *Primary Examiner.*